(12) United States Patent
Maier et al.

(10) Patent No.: US 6,373,982 B1
(45) Date of Patent: Apr. 16, 2002

(54) PROCESS AND EQUIPMENT FOR RECOGNITION OF A PATTERN ON AN ITEM PRESENTED

(75) Inventors: Udo Maier, Wildberg; Werner Ruppert, Schonaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,327

(22) Filed: May 7, 1999

(30) Foreign Application Priority Data

May 7, 1998 (DE) .......................... 198 20 353

(51) Int. Cl.[7] .................. G06K 9/00; G06K 9/72; G06K 9/03
(52) U.S. Cl. .............. 382/187; 382/229; 382/311
(58) Field of Search ................ 382/310, 311, 382/181, 182, 187, 224, 225, 229

(56) References Cited

U.S. PATENT DOCUMENTS 4,972,499 A * 11/1990 Kurosawa ............... 382/227
5,881,172 A * 3/1999 Pintsov ................... 382/227

FOREIGN PATENT DOCUMENTS

| JP | 61-42083 | 2/1986 | ............ G06K/9/00 |
| JP | 62-27874 | 5/1987 | ............ G06K/9/03 |
| JP | 62103784 | 5/1987 | ............ G06K/9/68 |
| JP | 4-302073 | 10/1992 | ............ G06K/9/68 |

OTHER PUBLICATIONS

Anegawa et al, "A System for Recognizing Numeric Strings from Topographical Maps"; IEEE Paper ISBN: 0–8186–7128–9, vol. 2, pp. 940–943, Aug. 1995.*
Minka et al,"Interactive Learning with a Society of Models"; IEEE Paper ISBN: 0–8186–7258–7, pp. 447–452, Jun. 1996.*
Gader et al, "Neural and Fuzzy Methods in Handwriting Recognition"; IEEE Paper ISSN: 0018–9162, vol. 30, Issue 2, pp. 79–86, Feb. 1997.*

* cited by examiner

Primary Examiner—Amelia M. Au
Assistant Examiner—Mehrdad Dastouri
(74) Attorney, Agent, or Firm—Karl O. Hesse

(57) ABSTRACT

Apparatus and method for improving recognition of patterns such as alphanumeric characters. A known recognition system is expanded to further include a complementary recognition system which is linked with the primary recognition system. An image that can not be positively recognized by the primary recognition system is passed on to the complementary recognition system and any characters not positively recognized by the complementary recognition are again passed on to a correction system. At the correction system, an operator classifies unrecognized characters which are then used to teach the complementary recognition system. Thus, the classified data of the correction system provide the training data for a continuous training process which is coupled with the correction system by a pattern adaptation system.

4 Claims, 2 Drawing Sheets

4=29
9=15
1=5
Rejection by primary recognition

Result of complementary recognition after training

4=45
9=39
1=20
Rejection of the character before training

PROCESS AND EQUIPMENT FOR RECOGNITION OF A PATTERN ON AN ITEM PRESENTED

BACKGROUND OF THE INVENTION

1. Field of the Invention

The invention relates in general to processes for recognition of a pattern on an item presented. In particular, it relates to a process involving a continuous pattern adaptation. The invention further relates to equipment to execute such a process.

2. Background Art

The recognition of characters or character patterns on presented items represents a function of ever-growing importance in the modern business world. Particularly in the field of banking and other financial activities, data processing equipment with character recognition units are employed in order to facilitate processing of transfer instructions, pre-printed checks and other vouchers without manual assistance. Such recognition units are also employed in automatic letter sorting.

For such purposes one uses a specified set of identifiers, such as the alphanumeric set of characters including certain special characters. The recognition process is then used to allocate an identification giving maximum possible reliability to a character for recognition.

To do this, after detailed pre-processing of the subject data in an initial stage of a classifier for the item to be recognized, numerical evaluations known as credibility factors are estimated for one or several identifiers for consideration, which in a subsequent stage are employed as the basis for decision regarding allocation of the item to an identifier.

These allocation decisions are subject to residual faults, produced through rejects and acceptance of inaccurate identifiers which are often called substitutions. The desire for the minimum possible number of rejections and simultaneous minimum number of substitutions places contradictory requirements on the automated recognition process.

In order to improve reliability of pattern recognition, experiments have been made using what is known as the "multi-voting" process. In this process, the reading results for the same character pattern from several pattern recognition units are further processed to what is known as a "narrowing unit", which compares the results and selects the overall result in accordance with the following rules:

a) If all the recognition units produce the same result, the overall result can be selected from any recognition unit desired;

b) If none of the recognition units is able to provide a reliable result, the overall result is a "reject" (not recognizable);

c) If the results of all the recognition units are the same, but among them there is at least one with a reliability factor which is greater than a previously defined threshold value (e.g. 50%), then the most reliable value is selected as the overall result;

d) If the results of all the recognition units are disparate, the overall result is a "reject" (not recognizable).

From DE 41 33 590 A1 we know of a process for classification of such signals, which in each case represents one of several possible amplitude values of the signals. In this process, the following working stages take place in parallel in one or more channels:

i) Samples are formed from several scanned values in each case;

ii) At least one characteristic is extracted from each sample;

iii) The characteristic or characteristics extracted from each sample are used as addresses, so that one can read out from a table, occurrence probabilities which are stored in it.

For further evaluation, from the occurrence probabilities of all samples a decision dimension is calculated and compared with a prescribed threshold value.

DE 21 12 919 B2 sets out a further arrangement for recognition of characters patterns using the multi-voting process. This arrangement contains an initial character pattern processing path, which has a collection array, which takes information from the characters, a processing array, which receives the signals from the collection array for processing and a decision array, which receives the signals from the processing array and in which a character is recognized, causing a decision signal to be displayed at its outlet. In addition, a second character processing path is used, which consists on the one hand of a further collection array and/or a further processing array and the decision array already present, or on the other hand, in each case of a second collection, processing and decision array. At least one of the three arrays of the second character processing path works in accordance with a different principle from the corresponding array of the first character processing path, and at the outlet of the second character processing path a decision signal together with a decision signal from the first character processing path is fed into a comparison array, which produces a recognition signal if the two match.

The multi-voting process further requires the use of at least two recognition units, each employing a different recognition algorithm. Experience shows, however that this arrangement only slightly improves the reliability of the recognition process compared with previous processes.

From DE 44 07 998 C2 we know of a process for recognition of a pattern on a voucher, where at least two different pattern recognition units are used to recognize the pattern. Means are also provided to determine a credibility factor represented by an un-sharp variable for each pattern recognized by the pattern recognition units, as well as means to evaluate the patterns recognized with the aid of the specified credibility factors.

DE 44 36 408 C1 describes a pattern recognition process, in which in a training phase a calibration specification is produced for the valuations for possible identifiers proposed by a classifier, and in the recognition procedure the valuations estimated by the classifier are replaced by different values using the calibration specification.

Finally, JP-A-8235304 describes a character recognition apparatus with a first and a second recognition unit, in which the second recognition unit has a supplementary dictionary as well as a monitoring unit. The extracted characteristic is fed to the dictionary in accordance with a correction character prescribed by the user, and character recognition is performed again. Once the second character recognition is completed, the additional dictionary is initialized.

In most cases present day pattern recognition systems contain, in addition to appliances for optical picture recording and the actual recognition units, a correction station, which for postal applications may be a video coding system, on which rejects are displayed and are manually corrected by people specially trained to do so. The corrected data, i.e. the video pictures of the unrecognized or inadequately recognized characters (non-coded information, NCI), together with the relevant manually input correct characters (coded information, CI) are in this case not further used for recognition purposes, but only for correction purposes.

In the development of a pattern recognition system, large quantities of character patterns are collected in a training database. They must be representative of the proposed recognition task. In the next stage, the characters are digitalized using an optical scanner (NCI data) and allocated entirely to the desired character categories, e.g. letters, numbers or even special characters. This section is also called the training process. The quality of character recognition depends to a large extent on this training database. If the data are

- not representative
- incomplete in terms of character form categories
- out of line with reality in the distribution of character form
- obsolete, as regards new fonts or trendy handwriting
- obtained from a different optical recording system, this produces unsatisfactory recognition results, although the training process has been performed correctly.

The training processes are expensive, since a number of steps are necessary to undertake them, e.g.

- collection of patterns
- assessment of their representativeness
- scanning in of patterns
- manual allocation of characters to a character category
- testing of the new classifiers.

Consequently, these training processes are performed as seldom as possible. It is expected that there will be about one year or more between two versions of recognition software. Also the collection of data necessary is a problem, as genuine data is often confidential or personal, as in the case of personal letters.

SUMMARY OF THE INVENTION

These and other disadvantages of the known prior art are overcome by the instant invention which provides a complementary recognition system which is linked with the primary recognition system. An image that can not be positively recognized by the primary recognition system is passed on to the complementary recognition system and any characters not positively recognized by the complementary recognition are again passed on to a correction system. At the correction system, an operator classifies unrecognized characters which are then used to teach the complementary recognition system. Thus, the classified data of the correction system provide the training data for a continuous training process which is coupled with the correction system by a pattern adaptation system.

Consequently, one advantage of the present invention is a process for recognition of characters which enables an improved rate of recognition to be achieved.

A further advantage of the invention is a recognition process enabling the relevant recognition systems to continuously learn the unique patterns used by the current user without the need for special versions of recognition software to be created for each user.

These and other advantages of the invention which will become apparent to the reader of this document are achieved by the apparatus described in the following specification of preferred embodiments of the invention and claimed in the following claims.

DETAILED DESCRIPTION OF PREFERRED EMBODIMENTS OF THE INVENTION

Figure 1:
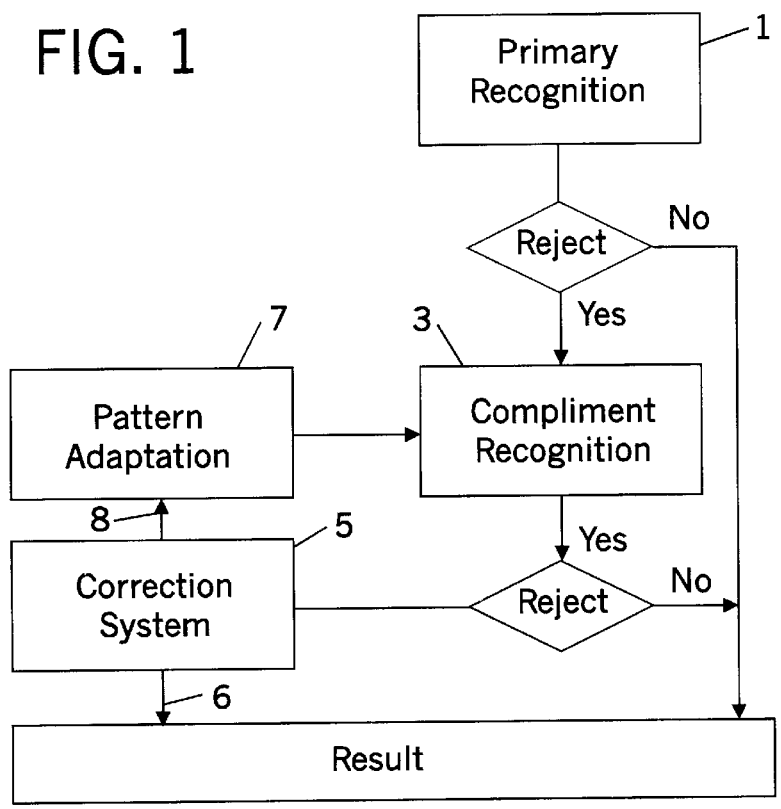
FIG. 1 shows a block diagram of the overall recognition system of the invention.

FIG. 1 shows in diagram form the structure of the overall recognition system of the preferred embodiment of the invention. It consists of at least two recognition sub-systems, what is known as the primary recognition 1 and after this, a component 3, which has been trained to recognize, in particular those characters which the primary recognition has not recognized or only poorly recognized. Hence, this subsequent component uses a set of characters which is complementary to the primary recognition and it is therefore designated complementary recognition. In addition, it must contain matrices with form categories, so that it is able to recognize, whether for example a new trendy character form has appeared. FIG. 1 shows only two recognition subsystems 1 and 3. However, those of ordinary skill in the art of character pattern recognition will realize that it is possible to have other such sub-systems, either inserted between the primary recognition and complementary recognition or, following the complementary recognition.

The primary recognition has all the features of a normal recognition system in which classifiers for the individual text are determined by a pattern adaptation process. These classifiers contain characteristics of different types of writing, which are to be recognized in the recognition process. Thus, the primary recognition consists of

- the recognition algorithms and
- the classifiers.

Classifiers have a considerable influence upon the recognition result. When the primary recognition sub-system operates, it provides a confidence figure for the degree of similarity of a character with a character pattern from the pattern adaptation process. If the confidence figure for a proposed character is high, the risk of substitution is low. If the confidence figure drops, there is an increased risk that a character will be incorrectly recognized. According to the invention, all classified characters from the primary recognition 1 having a confidence figure below a prescribed threshold value are now passed to the complementary recognition sub-system 3.

Reject characters which are either unrecognized or only erroneously recognized by the complementary recognition sub-system are then passed on to a correction system 5, which takes the form of a video coding system. The rejected patterns are manually observed and correct codes are entered at the correction system station. The correct codes normally form the end result of the character recognition process of the prior art systems and are output at arrow 6 of FIG. 1.

The recognition system of the invention however has an additional pattern adaptation system 7, coming after the correction system 5 and arranged between the correction system and the complementary recognition 3, making it possible to use the input originating from the correction system 5 for further training or teaching of the complementary recognition 3 in a continuous process. Thus, the additional pattern adaptation or training process is affected by the inputs from a correction system, and the correct characters identified in the correction system are used to initiate a continuous adaptation process. In one of the preferred embodiments, the correct character codes identified in the correction system are not directly output as the final result, but are passed to the pattern adaptation system via arrow 8 in FIG. 1. Hence, the pattern adaptation process takes place on-line during the actual recognition process and the required correction input at the correction system.

In one embodiment of the invention, each complementary character pattern is manually given what is known as a master-identification. The master-identifications are input at the correction station. This master-identification is needed by the training process to be able to calculate the classifier and to test the rate of recognition, that is to determine rejects, substitutions and hits. A major advantage of direct transfer of training data from the correction station, is that the pattern data has already been read by the appropriate scanner and given an identification, so that it is representative of subsequent patterns that will be encountered by the system.

As described above, the manual process of providing master-identification is made in the correction station itself. This has the advantage over a separate, off-line training process, since it is less time consuming and cheaper. The proposed on-line pattern adaptation process starts automatically if the following conditions are met:
- An adequate quantity of classified characters have been collected
- A specific time for triggering the process is defined such as at a change of shift of employees).

The pattern adaptation process generates the classifiers on the basis of classified characters. After this, the recognition result achieved by the newly generated classifiers is again verified in a test run. If the result reaches a certain specified quality, the old complementary recognition is replaced by the current new one.

Therefore, as a result of this on-line pattern adaptation process, the subsequent complementary recognition 3 is able to concentrate upon the weaknesses of the primary recognition 1 and again reduce the number of rejected character patterns and increase the confidence that they are not substitutions of incorrect character codes. A reject is thereby converted into a recognized character or hit. The on-line continuous collection of these poorly recognized characters and further processing in a training or pattern adaptation process results in a reduction in cost for expenditure of manual labor incurred on corrections and an increase in the recognition quality.

Further detailed explanation is set out below of the process of pattern adaptation in the training process using FIG. 2 as an example.

The primary recognition 1 has a classifier which, together with the recognition algorithms form a recognition unit. Thus, the recognition performance of this primary recognition is specified and can only be corrected via a software update. But as already indicated above, updates of the classifiers are rarely provided for cost reasons. Therefore, there is only a slight possibility of adaptation to the text, for example of a customer and the recognition weaknesses of certain characters have to be frequently accepted by the user and repeatedly corrected over a long period.

However, with the complementary recognition 3, the classifiers are separated from the individual algorithms, since these classifiers are calculated wit h t he newly classified characters from the correction station always with the same training algorithms. Consequently, classifiers are continuously improved through the pattern adaptation process, and the new classifiers in combination with the existing recognition algorithms produce the new complementary recognition each time. The classifiers are automatically upgraded on-line by substituting improved classifiers incorporating the latest manual correction input. In this way, the complementary recognition system 3 concentrates primarily upon the weaknesses of the primary recognition system 1, as the complementary classifiers are being trained appropriately.

Figure 2:
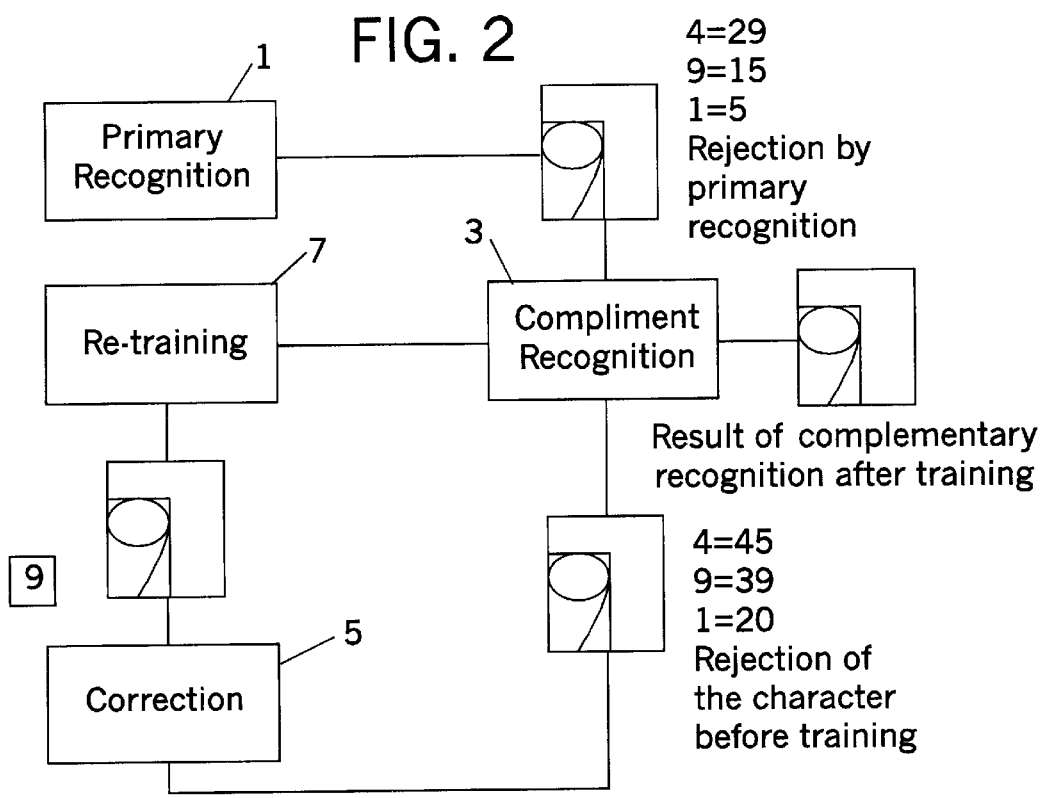
FIG. 2 shows a flow diagram of the method of the training process of the invention.

In the example in FIG. 2, a character rejected by the primary recognition 1 (a reject pattern) is passed to the complementary recognition 3. The confidence figure for the character "four" is "29", which results in the character being passed to the complementary recognition 3 as it comes below the prescribed threshold value (which in this example is "30"). The first attempt at classification by the complementary recognition 3 also results in rejection of the character, since the confidence figure which would result in classification of the character as "four" is too close to the confidence figure for "nine". It is within the scope of the invention that both the individual thresholds and the range within which two characters are rejected due to confidence figures being too close to each other, can be specified as desired. Consequently, the complementary recognition 3 also decides to reject the character. The image field in which the rejected character pattern lies, that is in the present case the segmented character image of non-coded information, which complies with a standard scaled character frame acceptable to the pattern adaptation process, is now passed on to the correction system 5. Here the character is given a master identification as described above. Thus, the person at the control system has characterized the character clearly, in this case as the number "nine". The non-coded information is now stored as an image with additional attributes in a database containing candidates for the additional pattern adaptation or training process. Examples of these additional attributes are:
- Master identification
- Scanner resolution
- Width and height of the character frame
- Field for the recognition-ID.

The continuous on-line re-training process now ensures that the further classification of the complementary recognition 3 results in an adequately high confidence figure for classification as "nine". Thus, the character image of FIG. 2 is no longer rejected and passed to the correction system, but is recognized correctly by the re-trained complementary recognition system 3. The classifiers of the complementary recognition 3 are adjusted on-line as the re-training takes place at the work place during pattern processing, thus increasing the recognition quality of the overall system. Each classified character in the database of rejected characters is given a form category in the relevant character category. For each character category there are corresponding form categories, to cover the variance of characters for the training process.

Figure 3:
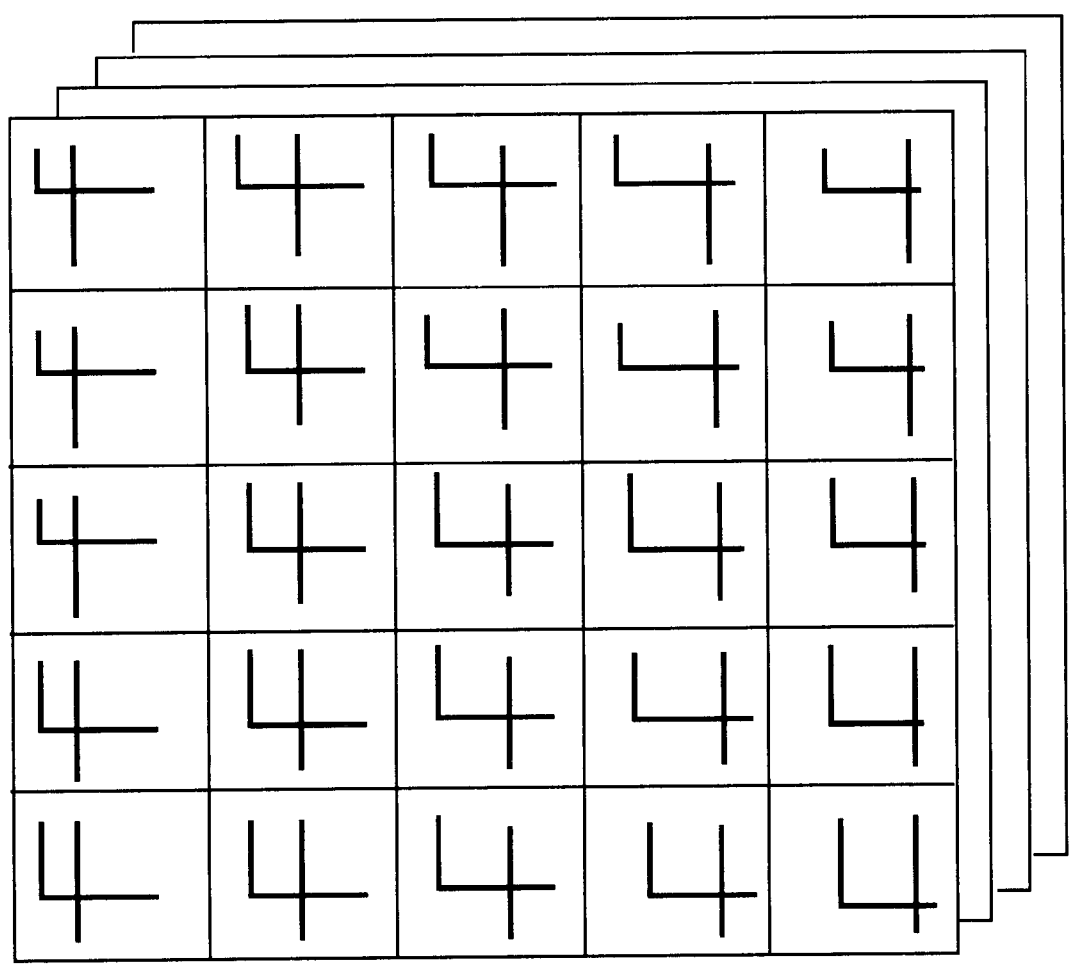
FIG. 3 shows an example of form categories of a character pattern in the form of a matrix of character patterns.

FIG. 3 shows the principle of the form categories for the character category "four". For each form category within a character category the relevant form categories from other character categories are used to calculate the classifiers automatically in a training run. For preference one uses a process in which zonal characteristics and anti-characteristics are used for recognition (cf. EP-B-O 632 404). This process has the advantage that after classification of the character in the correction system, no further manual attention is necessary in the re-training pattern adaptation process.

In an alternate embodiment of the invention it is possible to implement the pattern adaptation process in stages. In the first stage the corrected characters from the correction system are stored for a specified period. This data is then processed in the training process, which in some cases may be carried out at premises of the manufacturer of the recognition software. As a result of the training run, classifiers are obtained which are loaded into the complementary recognition. The complementary recognition now works as a subsequent recognition unit and passes the rejections to the correction system. However, in this first stage the continuous process for initiation of the first a recognition system takes place off-line. Here the correction station is only used to collect the initial training data. The characters are classified and the character outline is stored. Processing of the data in the training process takes place off-line. The classifiers from the first training process are then only loaded once the overall system is put into operation at the customer's premises.

In the second phase the training, or otherwise called re-training process is then incorporated into the complementary recognition, so that it is then initiated on-line and is able to read its data from a character database which is constructed by the correction system.

A major advantage of the system of the invention is that it constantly provides better results than the primary recognition system. Even if a new primary recognition system with new superior results were to come onto the market, the re-training of the complementary recognition sub-system still provides better results as described above. The complementary recognition system 3 only comes into operation when a reject occurs, and that is when improvement is possible via the complementary recognition.

The above described self-teaching complementary recognition system of the invention, significantly increases the recognition rate compared with the existing systems. Although the invention has been described with respect to the embodiments shown in FIGS. 1, 2 and 3, various changes in these embodiments, some of which have been suggested herein above and other embodiments will suggest themselves to those of skill in the art of pattern recognition without departing from the scope of the invention as defined in the following claims.

What is claimed is:

1. Apparatus for recognizing a pattern comprising:
a first pattern recognition system for recognizing a pattern with a first level of confidence;
a complementary pattern recognition system for recognizing with a second level of confidence, a pattern that cannot be recognized by the first pattern recognition system with the first level of confidence;
a correcting system for receiving manual pattern identification input when a pattern cannot be recognized by the complementary pattern recognition system with the second level of confidence;
a pattern adaptation system connected to the correction system for receiving pattern identification information from the correction system, the pattern adaptation system including:
  a database for receiving information originating from input to the correction system, the database including:
    means for storing patterns of characters to be recognized by the complementary recognition system; and
    means for storing attribute information for each pattern to be recognized by the complementary recognition system, the means for storing attribute information including:
      means for storing a master identification of a related stored pattern;
      means for storing scanner resolution of a related stored pattern;
      means for storing width and height of a character frame of a related stored pattern; and
      means for storing a recognition-ID of a related stored pattern;

the pattern adaptation system providing adaptation of the pattern recognition information supplied to the complementary recognition system to improve the recognition level of confidence of the complementary recognition system.

2. Apparatus for recognizing a pattern comprising:
a first pattern recognition system for recognizing a pattern with a first level of confidence;
a complementary pattern recognition system for recognizing with a second level of confidence, a pattern that cannot be recognized by the first pattern recognition system with the first level of confidence;
a correcting system for receiving manual pattern identification input when a pattern cannot be recognized by the complementary pattern recognition system with the second level of confidence;
a pattern adaptation system connected to the correction system for receiving pattern identification information from the correction system, the pattern adaptation system including a database for receiving information originating from input to the correction system; and
means for determining that identification information for an adequate quantity of patterns has been collected; and
means for determining that a specific time has arrived for using the collected pattern identification information to adapt the pattern recognition information supplied to the complementary recognition system to improve the recognition level of confidence of the complementary recognition system.

3. Method of recognizing a pattern comprising the acts of:
recognizing a pattern in a primary recognition system with a first level of confidence;
recognizing in a complementary recognition system with a second level of confidence, a pattern that cannot be recognized by the primary pattern recognition system with the first level of confidence;
receiving manual pattern identification input at a correction station when a pattern cannot be recognized by the complementary pattern recognition system with the second level of confidence;
receiving pattern identification information at a pattern adaptation system from the correction system;
storing information originating from input to the correction system in a database including patterns of characters to be recognized by the complementary recognition system and for each pattern to be recognized by the complementary recognition system:
  storing in the database, a master identification of a related stored pattern;
  storing in the database, scanner resolution of a related stored pattern;
  storing in the database, width and height of a character frame of a related stored pattern; and
  storing in the database, a recognition-ID of a related stored pattern; and then
    adapting the pattern recognition information supplied to the complementary recognition system to improve the recognition level of confidence of the complementary recognition system.

4. Method of recognizing a pattern comprising the acts of:
recognizing a pattern in a primary recognition system with a first level of confidence;
recognizing in a complementary recognition system with a second level of confidence, a pattern that cannot be recognized by the primary pattern recognition system with the first level of confidence;

receiving manual pattern identification input at a correction station when a pattern cannot be recognized by the complementary pattern recognition system with the second level of confidence;

receiving pattern identification information at a pattern adaptation system from the correction system; and determining when identification information for an adequate quantity of patterns has been collected; and determining when a specific time has arrived for
adapting the pattern recognition information supplied to the complementary recognition system to improve the recognition level of confidence of the complementary recognition system.

* * * * *